Patented Mar. 25, 1924.

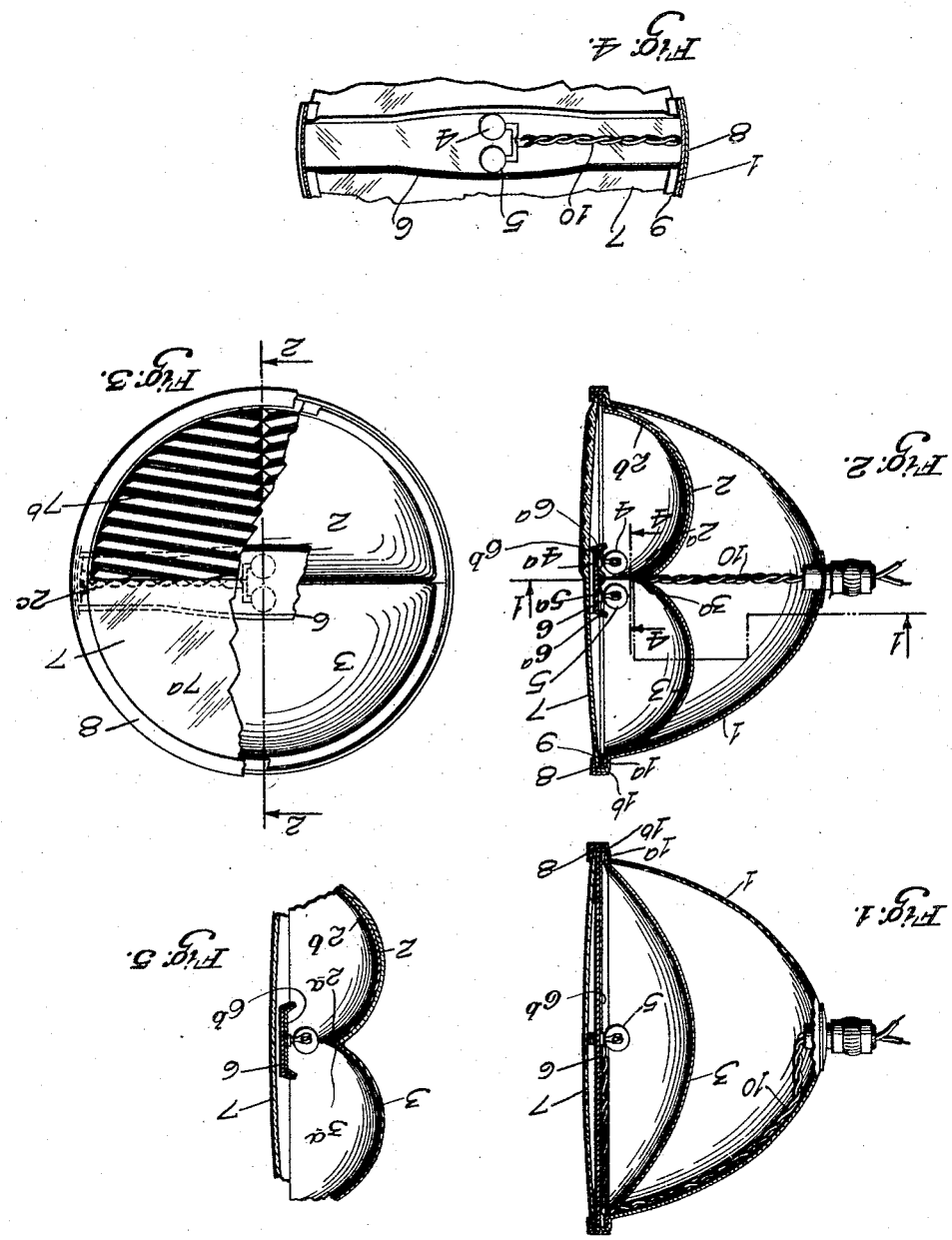

1,488,072

UNITED STATES PATENT OFFICE.

FREDERICK H. SHORE, OF SAN DIEGO, CALIFORNIA, ASSIGNOR OF ONE-HALF TO WAYNE M. KNIGHT AND THOMAS L. KNIGHT, BOTH OF SAN DIEGO, CALIFORNIA.

VEHICLE HEADLAMP.

Application filed December 23, 1921. Serial No. 524,521.

*To all whom it may concern:*

Be it known that I, FREDERICK H. SHORE, a citizen of the United States, residing at San Diego, in the county of San Diego and State of California, have invented certain new and useful Vehicle Headlamps, of which the following is a specification.

My invention relates to headlight lamps for vehicles and more particularly to an anti-glare headlight lamp, and some of the objects of my invention are: First, to provide a headlight lamp of this class in which the electric bulb is extended backwardly and is hidden from view, thus preventing the glare due to the bulb common to the present headlight; second, to provide a headlight lamp of this class in which only the reflected rays are thrown out from the lamp; third, to provide a headlight lamp of this class which will throw out powerful rays of light on the road ahead and still not throw a glare on approaching vehicles or pedestrians; fourth, to provide a headlight of this class which will throw a flood of light to both sides as well as ahead; fifth, to provide a headlight of this class which can be placed at any angle without throwing out a glare; sixth, to provide a headlight of this class in which the lower portion provides light for the roadway and in which the upper portion provides light for an approaching vehicle; seventh, to provide a headlight of this class which is very simple, economical of construction, durable, easy to adjust, and which will not readily deteriorate or get out of order, and eighth, to provide a novelly constructed headlight lamp.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional view of my headlight lamp through 1—1 of Fig. 2; Fig. 2 is a sectional view through 2—2 of Fig. 3; Fig. 3 is a front view of my headlight lamp with the lens and other parts broken away; Fig. 4 is a fragmentary sectional view through 4—4 of Fig. 2 showing the electric light bulbs and wiring in position on the lamp support and Fig. 5 is a fragmentary sectional view showing a slight modification of the lighting arrangement.

Similar characters of reference refer to similar parts and portions throughout the several views of the drawings.

The headlight lamp housing 1, the lower silvered enameled reflector 2, the upper porcelain reflector 3, lamp bulbs 4 and 5, supporting bar 6 and lens 7 constitute the principal parts and portions of my headlight lamp.

The headlight housing 1 may be of the conventional type and shape with an annular flange $1^a$ and ring $1^b$ at its larger periphery to take the outer flanges of the reflectors 2 and 3 respectively, said reflectors being held in place by the felt or rubber washer 9 against which is clamped the lens 7 by the lens retaining ring 8 in the conventional manner or obviously may be hinged and square or other shape. The reflector is made in two parts, each part or portion performing a definite function; the lower reflector 2 is polished or silvered and covered with a white enamel $2^b$, as shown in Figs. 2 and 5 of the drawings, which white enamel does not absorb light but throws rays out in the most efficient manner. The upper reflector 3 made of white porcelain or similar substance to give a brilliant white but not a glaring light for the approaching vehicles or pedestrians. These reflectors 2 and 3 are parabolic in shape though somewhat distorted, the horizontal radii being approximately twice as long as the vertical. The reflectors 2 and 3 are butted together at $2^a$ and $3^a$ in the horizontal center plane of the headlight. The electric lamp bulbs 4 and 5, one on each side of the horizontal center line are held in position by their respective sockets $4^a$ and $5^a$ in the reverse order of the general practice. Said sockets are in turn secured to the support 6 which is provided with silvering $6^b$ on its back side. Said silvered support with its back toward the lens 7 is held in place by its ends being clamped between the washer 9 and the lens 7 by the lens retaining ring 8. Said silvered support 6 having flanges $6^a$ extending the full length of said support at its upper and lower edges prevents the direct rays from the front of the headlight. The silvering on the inside of said silvered support also reflects stray rays of light on the reflectors. The lens 7 is concavo-convex and circular in shape, the upper half 7ª being plain and the lower half 7ᵇ being constructed in the prism style slightly inclined with the horizontal plane downwardly from the center thus further causing the rays to be thrown on the roadway. The electric conductor 10 is preferably brought to the lamp bulbs 4 and 5 by passing through the orifice 2ᶜ of the reflectors and extending along the inside face of the silvered support.

In the modified construction shown in Fig. 5 there is only one lamp used so positioned on the silvered support as to take the place of the two bulbs 4 and 5 shown in Figs. 2 and 4.

Though I have shown and described a particular construction, combination and arrangement of parts and portions I do not wish to be limited by this particular construction, combination and arrangement but desire to include in the scope of my invention the construction, combination and arrangement substantially as set forth in the appended claims.

Having thus described my invention what I claim as new and desire to secure by Letters Patent is:

1. An anti-glare headlight lamp, including a housing, a pair of concave reflectors, one positioned above the other in said housing, a horizontal support extending across the middle of said housing at the juncture of said concave reflectors and secured to the opposite sides of said housing, said support being provided with inwardly extending flanges and with a reflecting medium on its inner side and a lamp positioned on the inner side of said support extending toward said reflectors.

2. An anti-glare headlight lamp, including a housing, a pair of concave reflectors one positioned above the other in said housing, lamps positioned centrally in said housing in front of said reflectors, a horizontal support extending across said housing and secured at the opposite sides thereof upon the back side of which said lamps are mounted and a lens provided with angular prisms in the lower half thereof positioned in the front side of said housing.

3. An anti-glare headlight lamp, including a pair of concave reflectors, one positioned above the other and extending to a median line, the upper reflector's surface being porcelain, the lower one's surface being silver and provided with a coating of white enamel, a horizontal support positioned in front of said reflectors over said median line and lamps supported on the back side of said support and extending inwardly, toward said reflectors.

4. An anti-glare headlight lamp, including a pair of concave reflectors, one positioned above the other and extending to a median line, the upper reflector's surface being porcelain, the lower one's surface being silver and provided with a coating of white enamel, a horizontal support positioned in front of said reflectors over said median line, lamps supported on the back side of said support and extending inwardly, toward said reflectors, and silvering positioned on the back side of said support.

5. An anti-glare headlight lamp, including a reflector the upper half of which is surfaced with porcelain, the lower half with white enamel, a lamp positioned in front of said reflector, a lamp support upon which said lamp is mounted provided with inwardly extending flanges and with a reflecting medium on the inner surface of said support.

In testimony whereof, I have hereunto set my hand at San Diego, California, this 15th day of December, 1921.

FREDERICK H. SHORE.